UNITED STATES PATENT OFFICE.

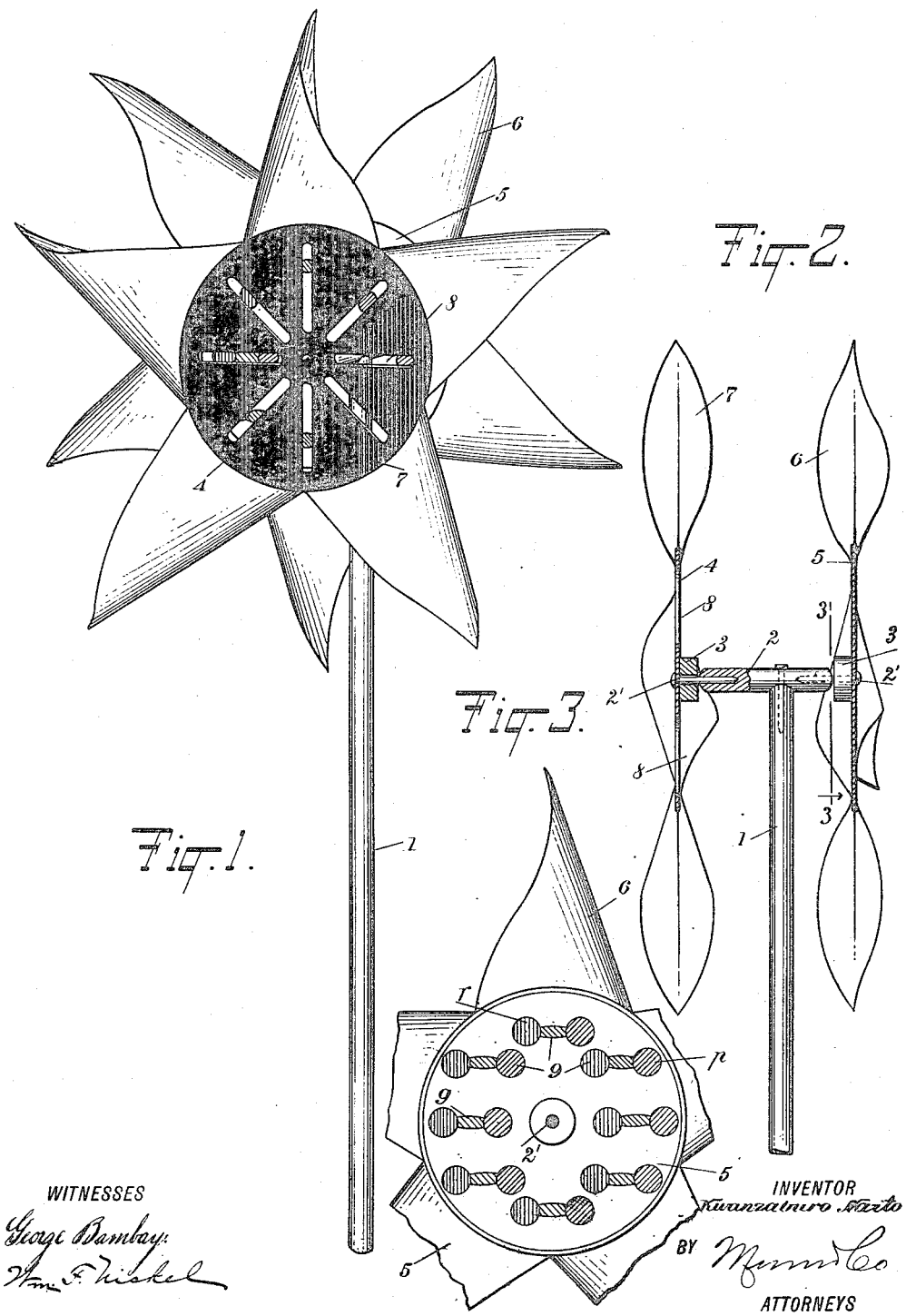

KWANZABURO NAITO, OF ATLANTIC CITY, NEW JERSEY.

WIND-WHEEL TOY.

1,155,263.

Specification of Letters Patent. Patented Sept. 28, 1915.

Application filed May 13, 1911. Serial No. 627,006.

*To all whom it may concern:*

Be it known that I, KWANZABURO NAITO, a subject of the Emperor of Japan, and a resident of Atlantic City, in the county of Atlantic and State of New Jersey, have invented a new and Improved Wind-Wheel Toy, of which the following is a full, clear, and exact description.

My invention is a windwheel toy, and it comprises a plurality of oppositely-rotating disks, one of which has a colored face, and the other having a number of sight openings therethrough to permit the colors on the first disk to be viewed. The disks are operated in opposite directions by means of wind vanes, and, when in rotation, different visual effects are produced upon the eye of an observer looking through the openings in one disk at the colored face of the other disk.

Reference is to be had to the accompanying drawings forming a part of this specification, in which the same characters of reference indicate the same parts in all the views.

Figure 1 is a front perspective view of my improved toy; Fig. 2 is a vertical longitudinal sectional view thereof; and Fig. 3 is a sectional view on the line 3—3 of Fig. 2.

My improved toy comprises a stem or handle 1, on the top of which is a cross-bar 2. At the opposite ends of this cross-bar 2 are pivot pins 2', on which are mounted to rotate hubs 3. To each of these hubs is fixed to rotate therewith a circular disk, the front disk being indicated by the numeral 4, and the rear disk by the numeral 5. The rear disk has vanes 6, of folded paper or any other suitable material, attached to its periphery, and the front disk 4 has similar vanes 7, these vanes being so arranged that when a draft of air impinges upon them they will rotate in opposite directions.

The front disk has a number of radial slots 8, and the rear disk has a number of designs 9 done in color on its forward face. These designs may be of any desired contour and color or combination of colors. On Fig. 3, however, I have shown these designs as having the same outline as a dumb-bell, the balls of which are colored red at one end and purple at the other, as indicated by the letters *r* and *p*, and the intermediate parts or handles green, as indicated by the letter *g*. The dumb-bells are all arranged with their long axes parallel, as shown.

To use the toy, one takes hold of it by the stem 1 and turns it facing the direction in which the wind happens to be blowing. The forward disk 4 will rotate in one direction and the rear disk in an opposite direction, and any one looking through the slots in the front disk will observe the colored designs on the rear disk, but these colored designs will appear different, according to the speed of rotation between the disks 4. In this way a considerable range of pleasant visual effects can be obtained.

It will be observed that the multi-colored figures on the rear disk 5 have their long axes parallel, while the openings 8 in the front disk 4 extend in a radial direction, from the center outward. As the two disks rotate with reference to each other, each of the openings 8 will be in such a position at one time that only one of the colors of the designs 9 will be seen through the opening, and at another time all three of the colors will be visible therethrough. For example, when the long axis of an opening is transverse to the long axis of one of the figures 9, each of the three colors comprised in the design 9 will become visible in turn through the opening 8, as the disk 7 rotates. At a point sufficiently removed from this position of the opening 9, where the axis of the opening will be parallel to the axis of a figure on the rear disk, all three of the colors which make up the figure will be visible through the opening 8 at the same instant. This gives a continually changing optical appearance and enhances the chromatic effect of the toy.

The vanes 6 and 7, and the front face of the disk 4, can be colored in any way desired, to give the toy an attractive appearance. The construction of the toy is simple, and its operation easy, making it well adapted for the amusement of children.

Having thus described my invention, I claim as new and desire to secure by Letters Patent:

In a wind wheel toy, the combination of a pair of rotatable disks arranged one behind the other, means for setting said disks into rotation relatively to each other, one of said disks having colored elongated designs on its front face, with the long axes of said designs parallel with one another, and the other disk having a number of radially-extending openings therethrough, whereby when the said disks are in relative motion, different visual effects will be presented to the eye of an observer viewing the designs on one disk through the openings in the other.

In testimony whereof I have signed my name to this specification in the presence of two subscribing witnesses.

KWANZABURO NAITO.

Witnesses:
SHOZO MIDZUTANI,
RICHARD H. ROBERTSON.